United States Patent [19]
Hamano et al.

[11] 3,877,142
[45] Apr. 15, 1975

[54] METHOD OF MAKING A ROTARY ELECTRIC MACHINE ESPECIALLY SUITABLE FOR USE AS A STARTER FOR AUTOMOTIVE VEHICLE ENGINES

[75] Inventors: Satoru Hamano, Kariya; Takeshi Imai, Oobu; Takeshi Kimura, Hekinan; Shiro Goto, Nagoya, all of Japan

[73] Assignee: Nippondenso Co., Ltd., Kariya-shi, Aichi-ken, Japan

[22] Filed: Nov. 9, 1973

[21] Appl. No.: 414,523

Related U.S. Application Data
[63] Continuation-in-part of Ser. No. 211,401, Dec. 23, 1971, abandoned.

[30] Foreign Application Priority Data
Dec. 27, 1970 Japan............................. 45-126111

[52] U.S. Cl.................. 29/596; 29/605; 242/1.1 R; 310/45; 310/194
[51] Int. Cl......................................... H02k 15/02
[58] Field of Search........ 310/67, 43, 45, 254, 258, 310/259, 198, 179, 194; 29/596, 605, 628; 242/1.1 R

[56] References Cited
UNITED STATES PATENTS

| | | | |
|---|---|---|---|
| 2,443,457 | 6/1948 | Herman | 29/596 X |
| 3,028,266 | 4/1962 | Larsh | 310/45 X |
| 3,044,150 | 7/1962 | Higley | 29/596 |
| 3,052,418 | 9/1962 | Gorski et al. | 242/1.1 R |
| 3,145,127 | 8/1964 | Baun | 29/596 X |
| 3,276,275 | 10/1966 | Ebbert | 242/1.1 R |
| 3,525,799 | 8/1970 | Ellis | 29/628 X |
| 3,646,374 | 2/1972 | Jordan et al. | 310/45 |
| 3,710,437 | 1/1973 | Kipple et al. | 29/596 |

*Primary Examiner*—Carl E. Hall
*Attorney, Agent, or Firm*—Cushman, Darby & Cushman

[57] ABSTRACT

A rotary electric machine especially suitable for use as a starter for automotive vehicle engines having a yoke, a plurality of pole cores and a plurality of field coils corresponding to the number of poles. The inner and/or outer surface of the yoke and the field coil mounting surface of the pole cores are covered with an electrically insulating coating. The field coils are formed by continuously and directly winding a plurality of electrically insulated magnet wires around the central projecting portion of the pole cores within the space defined between the inner surface of the yoke and the field coil mounting surface of the pole cores, and an electrical insulator is applied to fill the gap between the magnet wires, between the yoke and the field coils, and between the pole cores and the field coils.

6 Claims, 19 Drawing Figures

METHOD OF MAKING A ROTARY ELECTRIC MACHINE ESPECIALLY SUITABLE FOR USE AS A STARTER FOR AUTOMOTIVE VEHICLE ENGINES

CROSS-REFERENCES TO RELATED APPLICATIONS

This application is a continuation-in-part of application Ser. No. 211,401, filed on Dec. 23, 1971 and now abandoned.

BACKGROUND OF THE INVENTION

1. Field of the Invention

This invention relates to a rotary electric machine especially suitable for use as a starter for automotive vehicle engines and more particularly to improvements in the structure of a so-called complete yoke composed of a yoke, pole cores and field coils.

2. Description of the Prior Art

At first, the structure of a conventional rotary electric machine used as a starter for automotive vehicle engines will be described with reference to FIG. 1. The conventional starter shown in FIG. 1 is composed of an armature 3, an armature shaft 3a having a helical splined portion 3b, washers 1 and 2 on the armature shaft 3a, a magnet switch 4, an overrunning clutch 5, a pinion 6, a stop collar 7 for the pinion 6, a pinion drive lever 8, a set bolt 9 for the pinion drive lever 8, a set screw 10 for the magnet switch 4, a drive side housing 11, a bearing bush 12 provided on the housing 11, an end frame cap 13, a commutator side end frame 14, a bearing bush 15 provided in the end frame 14, through bolts 16, a brush holder 17 including brushes 18 and brush spring 19, and a complete yoke 20 including a yoke 21, field coils 22, pole cores 23 and pole core fastening screws 24.

The structure of the complete yoke 21 in the conventional starter for automotive vehicle engines will be described in detail. The field coils 22 in the complete yoke 21 had a structure as shown in FIG. 2, and a flat type wire 25 was generally employed to form the field coils 22. The field coils 22 were made by winding the flat type wire 25 in the form of a rectangle while insulating the turns from each other by interposing a paper strip or a film of synthetic resin therebetween, tacking the ends of the winding by means such as a paper tape 26, taping the winding by means such as a cotton tape 27, and impregnating the cotton tape 27 with an electrical insulator such as insulating varnish. Thus, a plurality of steps were required for the manufacture of each field coil 22, including the first step of winding the flat type wire 25 while interposing the insulating paper between the turns thereof, the second step of tacking the ends of the winding by the paper tape 26, the third step of taping the entire winding with the cotton tape 27, and the fourth step of impregnating the cotton tape 27 with the insulating varnish. The conventional manufacturing process included further a fifth step or a so-called R-bending step of bending the entire field coil 22 into an arcuate shape so that it makes intimate contact with the inner surface of the yoke 21 when placed on such a surface. After the above step, one of the field coils 22 was connected to another by welding or soldering and the assembly was mounted in the yoke 21.

Thus, complex steps have been required for the manufacture of the complete yoke in the conventional starter of this kind. Especially, troublesome steps of tacking the ends of the winding and taping the winding with the cotton tape have been required for the manufacture of the field coils 22. Further, an additional step of interposing a buffer means such as paper between the field coils 22 and the yoke 21 has been required in order to avoid the danger of short circuit between the turns of the field coils during mounting in the yoke 21. All these steps are difficult to automate and require a lot of time and labor since many parts are included in the complete yoke, resulting in a very costly process.

On the other hand, in the step of forming a field coil by winding a large-diameter wire having a large circular cross section instead of winding a flat type wire, difficulties are also involved. For example, since such a wire is large and hence hard and not flexible, to wind the large wire in the form of a field coil is not easy. In addition, since the crossover track wires, e.g., as shown in FIG. 3a, between the field coils occupy a large space, the space available for the field coil windings is inevitably limited. Further, since the field coil is not wound around the pole core in close contact with the outer surface of the pole core as shown by a gap $g$ in FIG. 3b, the field coils occupy a large space wastefully.

Furthermore, where a single thin wire having a small circular cross section is employed, e.g., as thin as a tenth part of the cross section of the large wire mentioned in the previous paragraph, although the field coil formed by such a thin wire can be wound around the pole core in close contact therewith because of its softness and flexibility, the number of winding cycles for forming the field coil requires ten times as many, in order to obtain the same cross sectional area or the same current capacity of the field coil as that formed by a large wire. Since each of the field coils has thus 10 windings formed by a single thin wire, 10 thin wires, respectively at the winding-starting end and at the winding-terminating end, must be bundled to a bundle of thin wires so as to make connections.

The total wire length of each of the ten parallel windings around the pole cores is different due to the fact that the winding wound around the pole cores at first is the shortest in the total wire length, the winding wound secondly on and around the first winding is longer than the first one, the third winding is longer than the second one and so on. Accordingly, the amount of current which flows in each of the 10 windings is not the same and a great amount of current flows in the first winding, resulting in a degradiation of the performance of the starter for automotive vehicle engines.

SUMMARY OF THE INVENTION

With a view to eliminating the drawbacks above described, it is a primary object of the present invention to provide a starter for automotive vehicle engines which is light in weight and can be easily manufactured by complete automation without requiring the troublesome steps of tacking the winding, taping, R-bending, connection by welding or soldering and transportation to the assembling station.

In accordance with one aspect of the present invention, there is provided a rotary electric machine especially suitable for use as a starter for an automotive vehicle engine comprising a generally cylindrical yoke having an electrically insulating coating at least on the inner surface thereof, a plurality of pole cores each having an electrically insulating coating on the surface opposite to the inner surface of said yoke, a plurality of field coils formed by continuously and directly winding a wire assembly or conductor consisting of a plurality of randomly bundled electrically insulated magnet wires around the central projecting portion of said pole cores within the space defined between the inner surface of said yoke and the field coil mounting surface of said pole cores, and an electrical insulator applied to fill the gap between said magnet wires forming said field coils, between said field coils and said yoke, and between said pole cores and said field coils.

Magnet wires having a small diameter and bundled randomly are preferably employed in the present invention, because those having a large diameter are undesirable in that, when the field coil is composed of the large-diameter magnet wires, the curved surface of the field coil has a large area thereby occupying a considerable space and in that automation of the wire winding operation is difficult to realize.

The electrical insulator preferably used in the present invention should be such that it does not tend to develop cracks during the winding operation of the magnet wires and has a high resistance to corrosion, abrasion and impact in addition to a high dielectric strength. The results of tests made by the inventors have proved that thermoplastic resins such as polyvinyl chloride, polyethylenes and polyamides, and thermosetting resins such as epoxy resins and polyesters are satisfactory for the purpose. A thermoplastic acrylic resin, for example, one sold by the trade name of Lekton and generally used in painting utilizing electrophoresis, is also suitable for the purpose. The epoxy resins among these resins are most suitable as the characteristic requirements are sufficiently met when the epoxy resins are used to form the electrically insulating coating by means of electrostatic painting. Other electrical insulators such as polypropylenes and polyurethanes can also be used. When the resistance to heat and other porperties are taken into consideration, the epoxy resins are most suitable for coating the surface of the yoke, pole cores and magnet wires and filling the gap between the magnet wires, between the yoke and the field coils and between the yoke and the pole cores. However, the elctrical insulators are not limited to those above specified, and any other suitable ones may be used. The complete yoke having a construction as above described is very small in size and light in weight and can withstand strong vibrations, and it can be made by a fully automated process, whereas most of the prior art steps for the manufacture of complete yokes have had to resort to handwork.

The above and other objects, features and advantages of the present invention will be apparent from the following detailed description of the invention taken in conjunction with the accompanying drawing.

BRIEF DESCRIPTION OF THE DRAWING

FIG. 3b is an elevational view of the pole core shown in FIG. 3a.

DESCRIPTION OF THE PREFERRED EMBODIMENT

Figure 1:
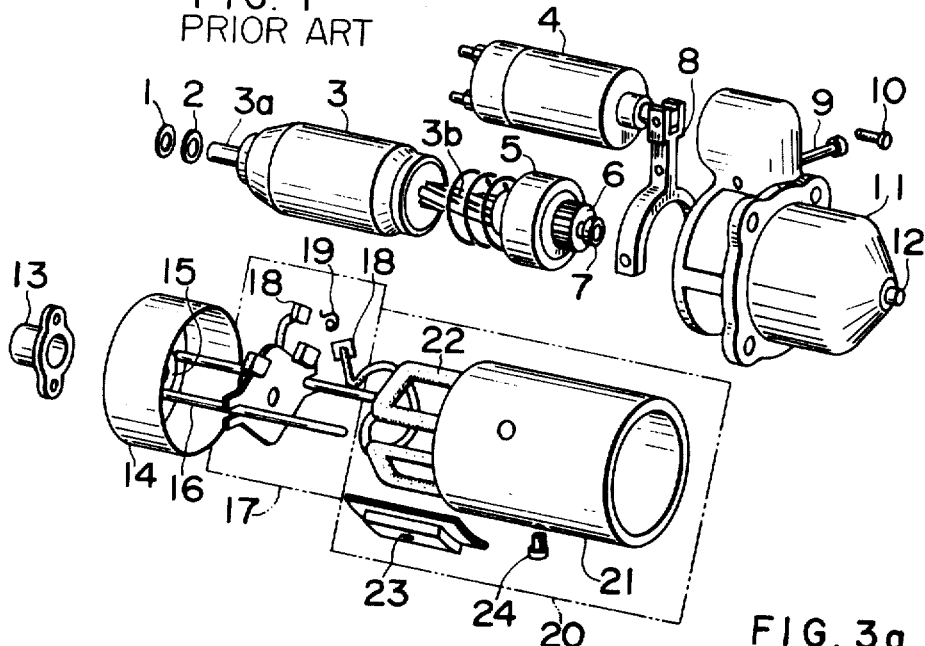
FIG. 1 is a schematic exploded view of a prior art starter for an automotive vehicle engine.
Figure 3A:
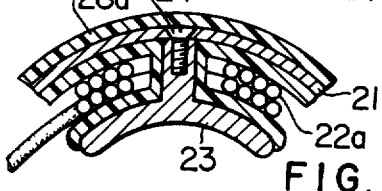
FIG. 3a is a sectional view of a pole core wound with a large diameter magnet wire.
Figure 2:
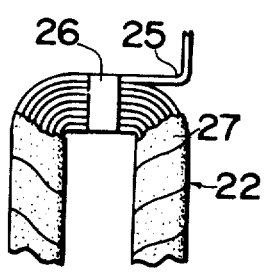
FIG. 2 is an enlarged partly cut-away view of a part of a field coil in the complete yoke shown in FIG. 1.
Figure 3B:
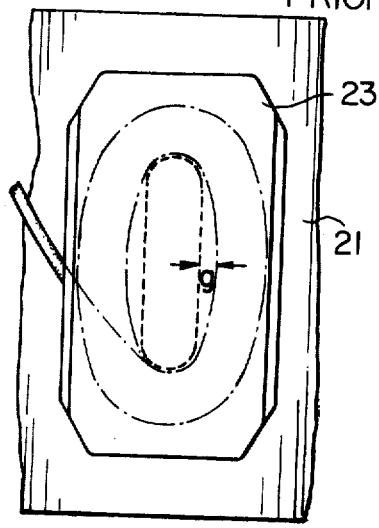
Figure 4:
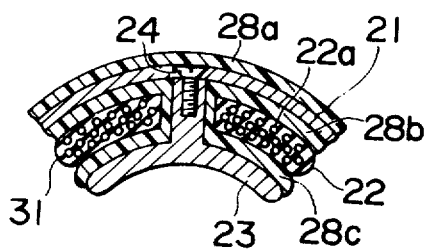
FIG. 4 is an enlarged section of a part of a complete yoke in a starter according to the present invention.
Figure 13:
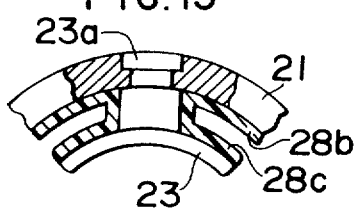
FIG. 13 is a section of a part of the complete yoke to show another form of the insulation applied to the yoke and pole core.

Referring to FIG. 4 a complete yoke according to the present invention comprises a cylindrical yoke 21, a plurality of field coils 22 each formed by winding a plurality of magnet wires 22a, and a plurality of pole cores 23, although only one field coil 22 and the associated pole core 23 are shown therein. The outer and inner surfaces of the yoke 21 and the surface of the pole core 23 opposite to the inner surface of the yoke 21 are covered with insulating coatings 28a, 28b and 28c, respectively, of an electrical insulator which is resistant to corrosion and has a high dielectric strength. In the complete yoke shown in FIG. 4, the pole core 23 is disposed at a predetermined position on the inner surface of the yoke 21 and is fastened thereto by means such as a set screw 24, and then the electrical insulator is applied to the assembly consisting of the yoke 21 and the pole core 23 thereby forming the insulating coatings 28a, 28b and 28c on the outer and inner surfaces of the yoke 21 and on the field coil mounting surface of the pole core 23, respectively. However, the yoke 21 and the pole core 23 may be separately applied with the insulating coatings 28a, 28b and 28c before they are assembled, and the yoke 21 and the pole core 23 having the insulating coatings 28a, 28b and 28c thereon may then be assembled. Further, as shown in FIG. 13, the pole core 23 may be secured to the yoke 21 by caulking as at 23a and the insulating coating 28b may be applied solely to the inner surface of the yoke 21. In this case, however, a corrosion resistant layer is preferably provided on the outer surface of the yoke 21 by means such as plating with a metal.

Figure 5:
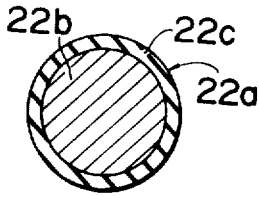
FIG. 5 is an enlarged section of a single magnet wire employed in the present invention to form a part of a field coil in the complete yoke.
Figure 6:
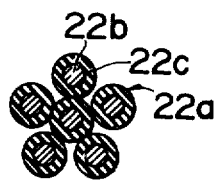
FIG. 6 is a section of an assembly of the magnet wires practically used in the present invention for forming the field coil.
Figure 7:
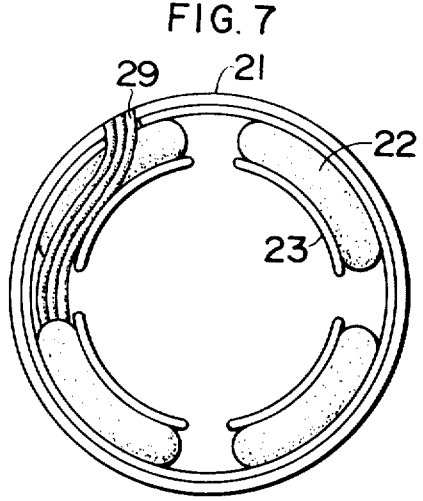
FIG. 7 is a bottom view of the complete yoke in the starter according to the present invention.
Figure 8:
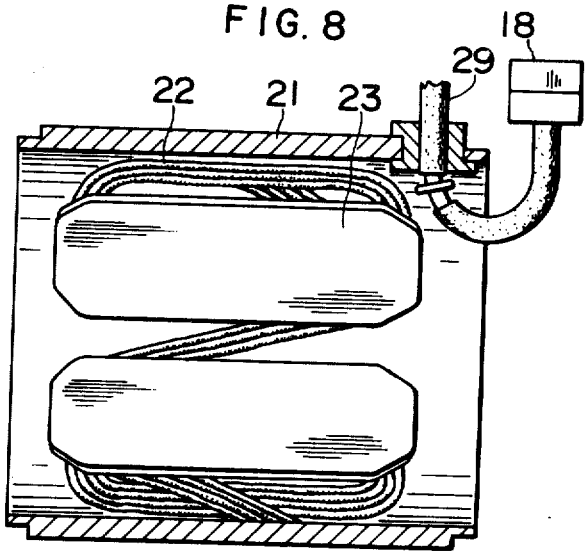
FIG. 8 is an axial section of the complete yoke shown in FIG. 7.
Figure 9:
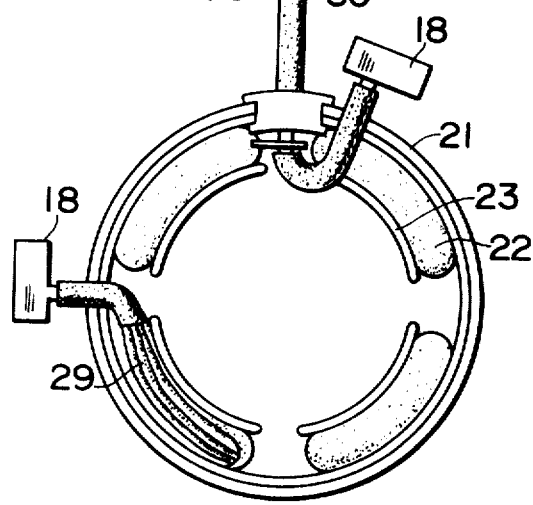
FIG. 9 is a plan view of the complete yoke shown in FIG. 7.

The field coil 22 is formed by directly winding the magnet wires 22a around the central projecting portion of the pole core 23 within the space defined between the electrically insulated inner surface of the yoke 21 and the electrically insulated, field coil mounting surface of the pole core 23. Referring to FIGS. 7, 8 and 9, the yoke comprises a plurality of such field coils 22 which are wound continuously depending on the number of poles. In the arrangement shown in FIGS. 7, 8 and 9, one end 29 or the other end 30 of the field coil 22 is preferably welded or soldered directly to the yoke 21 or connected directly to a brush 18 or a connector 32 without using a lead wire. The magnet wire 22a has such a structure that the outer surface of a conductor 22b of circular section is covered with an electrically insulating covering 22c as seen in FIG. 5. It is to be noted herein that, instead of winding the single magnet wire 22a shown in FIG. 5, a plurality of such magnet wires 22a are bundled in an unrestricted state, that is, in a state in which they are not coaxially twisted but are randomly arranged as seen in FIG. 6, and such a wire assembly or conductor is wound around the central projecting portion of the pole core 23 to form the field coil 22. After forming the field coil 22, an electrical insulator 31 is applied to fill the gap between the magnet wires 22a, between the field coil 22 and the yoke 21, and between the field coil 22 and the pole core 23 as seen in FIG. 4. This arrangement is advantageous in that the curved surface of the field coil 22 has a small area thereby occupying a small space and automatic winding of the coil can be easily realized. Another advantage resides in the fact that the electrical insulator 31 acts to firmly and insulatingly hold the field coil 22 between the yoke 21 and the pole core 23 and secure the magnet wires 22a together. The electrical insulator 31 may be applied during or after the winding operation for forming the field coil 22.

Figure 14A:
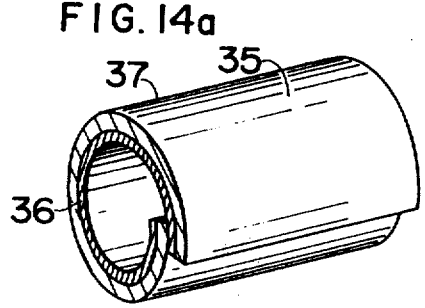
FIGS. 14a and 14b are perspective views of a connector used for connecting the magnet wires to, for example, a terminal.
Figure 14B:
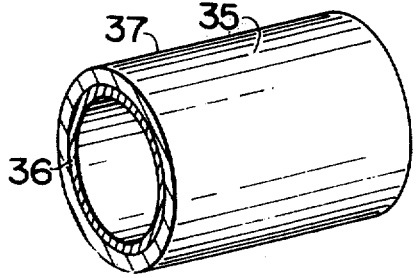

A connector 37 as shown in FIGS. 14a and 14b may be used to connect the magnet wires 22a to a terminal without stripping off the insulating covering 22c on the magnet wires 22a. The connector 37 has such a structure that a low-melting metal 36 such as tin, lead, solder or zinc is coated on the inner surface of a connecting sleeve 35. Thus, when electric welding is applied, the low-melting metal 36 covering the inner surface of the sleeve 35 is fused by the heat developed during the welding so that the magnet wires 22a can be easily connected to a terminal.

According to an experiment made by the inventors, good results can be obtained with a wire assembly or conductor consisting of five to seven magnet wires 22a having a diameter of 0.5 to 1.2 mm.

Figure 10:
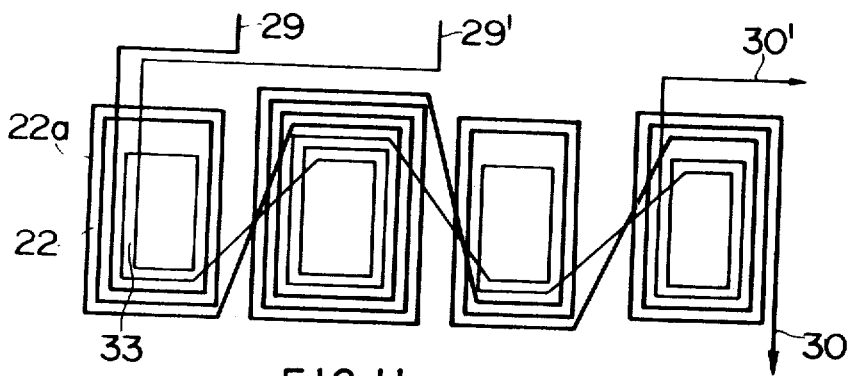
FIG. 10 is a diagrammatic view showing a winding arrangement in which a brake coil is combined with the field coils.

In the starter especially suitable for use in automotive vehicle engines, a winding arrangement as shown in FIG. 10 is preferred so as to facilitate the assembling and winding operation, improve the reliability against vibration and impact, and reduce the size and weight of the starter. Referring to FIG. 10, a wire assembly consisting of a plurality of randomly bundled magnet wires 22a is continuously and directly wound to form the field coils 22 within the space defined between the inner surface of the yoke 21 and the coil mounting surface of the pole cores 23, and another single magnet wire 22a is continuously and directly wound within the space containing the field coils 22 so that it extends in a manner as shown from one end 29' to the other end 30' and serves as a brake coil 33 which is connected in parallel with the armature. Further, an electrical insulator of the kind described is applied to fill the gap between the magnet wires 22a forming the field coils 22, between the field coils 22 and the brake coil 33, between the yoke 21 and the coils 22 and 33, and between the pole cores 23 and the coils 22 and 33 as in the case of the arrangement shown in FIG. 4.

Figure 11:
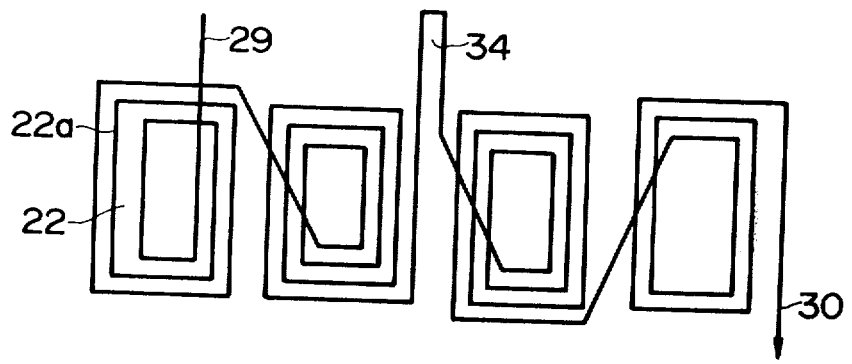
FIG. 11 is a diagrammatic view showing a winding arrangement in which a part of the magnet wire assembly is led out from between the field coils to be connected to, for example, a terminal.
Figure 12:
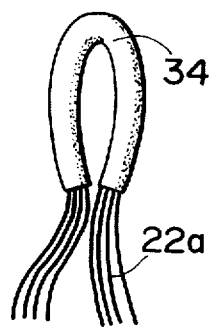
FIG. 12 is an enlarged detail view of the portion 34 shown in FIG. 11.

Referring to FIG. 11, one field coil 22 is formed on each pole core 23 in the manner above described and a portion 34 of the wire assembly consisting of the magnet wires 22a is taken out between the terminating end of one field coil 22 and the starting end of the next field coil 22 as shown so that this portion 34 can be engaged by a bolt or connected to a terminal. This portion 34 is shown in detail in FIG. 12. The conductors of the magnet wires 22a in this portion 34 are exposed by stripping off the insulating covering or a solder is applied thereto.

Figure 15:
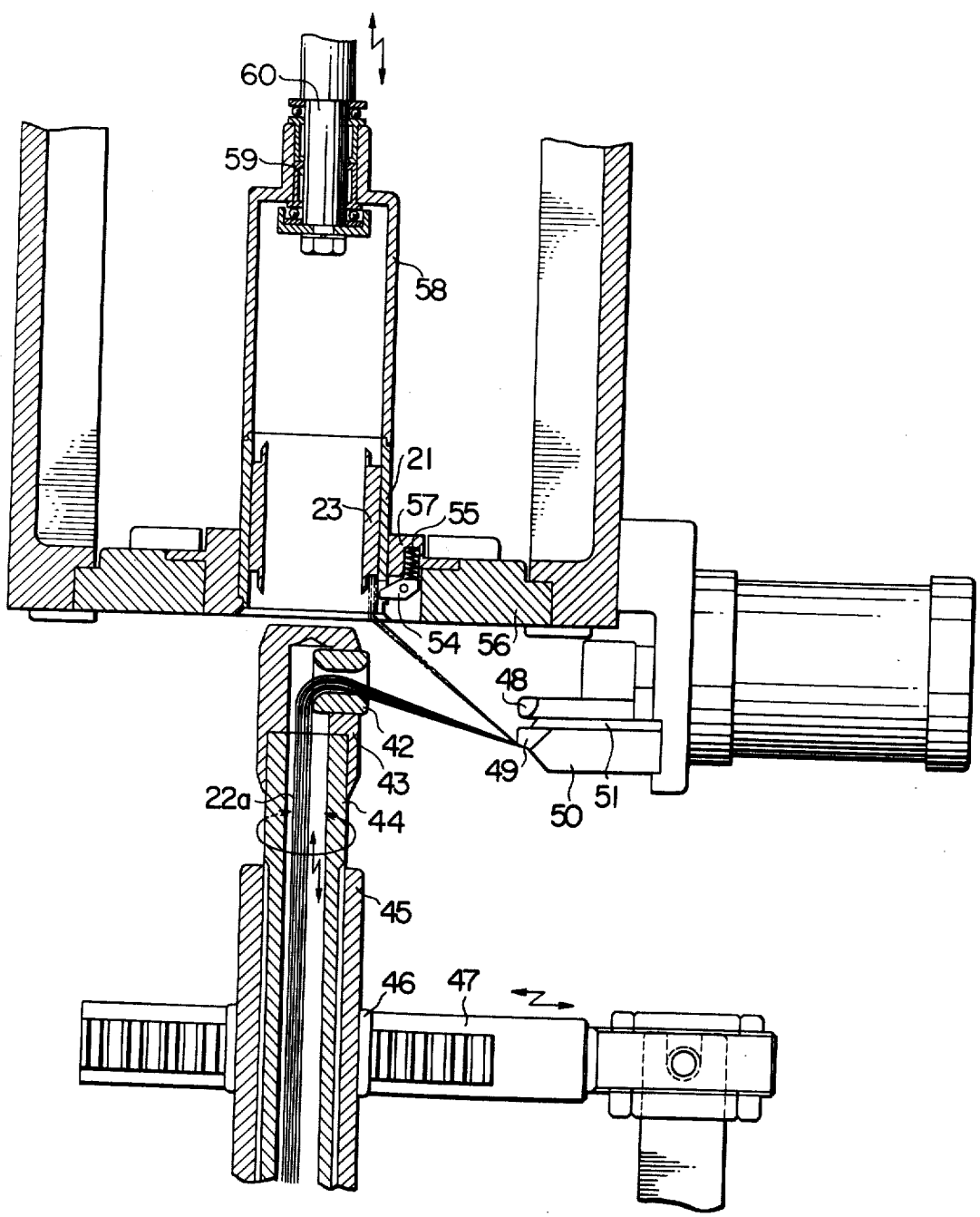
FIG. 15 is a partial sectional view of a part of a coil-winding machine useful to explain a step of forming field coils according to the invention.
Figure 16:
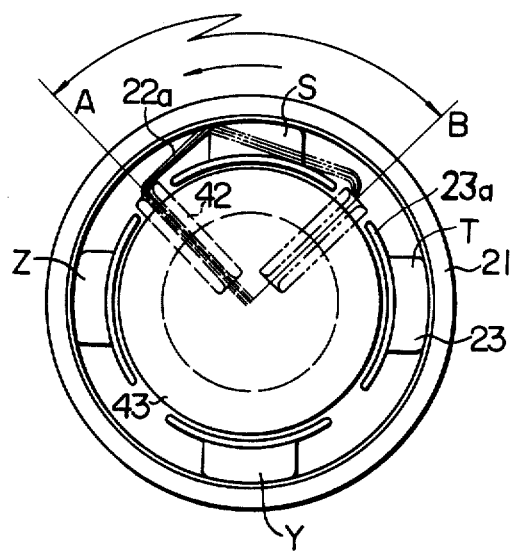
FIGS. 16 and 17 are diagrams useful to explain the movement of a nozzle of the coil-winding machine of FIG. 15.
Figure 17:
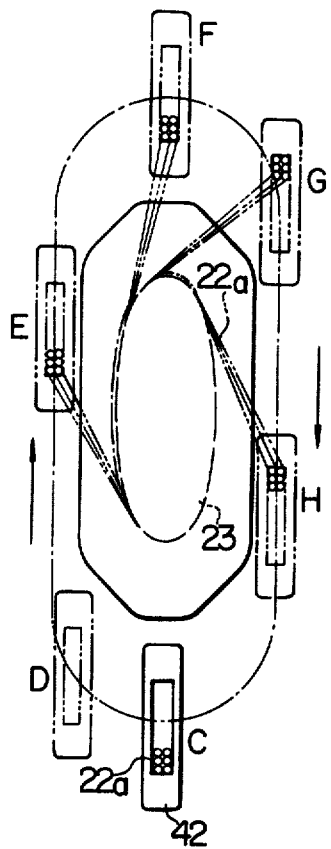

A step of winding the field coils according to the present invention is described more specifically referring to FIGS. 15 to 17. Magnet wires 22a are supplied through a nozzle 42 which is supported by a nozzle holder 43. A spindle 44 transmits a driving force derived from a driving member (not shown) directly to the nozzle 42 to cause downward-upward and rotational movements. A guide member 45 for the spindle 44 is provided integrally to the pinion 46. A rack shaft 47 is provided with a thread which engages with the pinion 46 and is drived linearly and reciprocatively along the axis thereof by the driving member (not shown) and controls the rotational movement of the nozzle 42. The spindle 44 is also driven by the driving member (not shown) to move reciprocatively along the axis thereof and thus controls the downward-upward movement of the nozzle 42.

Cutters 50 and 51 are guided by cutter-guides 48 and 49 and perform a cutting operation. A positioning member 54 is pivotally fixed to a pallet 56 and secures the yoke 21 at a right position. A spring 55 exerts its tensile force to make the positioning member 54 return to the original position. Reference numeral 57 represents a jig member for the yoke 21. A bearing 59 supports the load of a clamper 58 for fixing the yoke 21 and a rod 60.

In operation, when the driving force from the driving member (not shown) is transmitted to the rack shaft 47 and to the spindle 44, the spindle 44 commences upward-downward movement as well as rotational movement about the axis thereof as shown by the arrows in FIG. 15. Supposing that the nozzle 42 is positioned initially at a position c in FIG. 17 and the starting end of the magnet wires 22a is held securely by the pallet 56, when the spindle 44 is moved upwardly and at the same time rotated about the axis due to the rotation of the pinion 46 engaged with the spline at the outer surface of the spindle 44, the pinion 46 being engaged with the thread on the rack shaft 47, the nozzle 42 moves continuously upwardly with slight rotation about the spindle axis from the position C to position D, position E and to the uppermost position F. The nozzle 42 then moves downwardly to position G, position H and to the original position C to complete the movement round the pole core 23, for example in the clockwise direction as shown in FIG. 17. During the movement of the nozzle 42, the magnet wires 22a are supplied through the nozzle 42. By repeating such a movement of the nozzle 42, the winding of a field coil for one of the pole cores is performed. Referring to FIG. 16, position A of the nozzle 42 corresponds to the position E in FIG. 17, whereas position B corresponds to the position H in FIG. 17. After completion of the coil winding around the pole core S in FIG. 16, the pallet 56 is shifted by 90° about the axis of the spindle 44 thereby to cause the jig member 57 and hence the yoke 21 to shift the position by 90° about the spindle axis. Accordingly, in FIG. 16, the pole core T is brought to the position at which the pole core S was previously positioned and the coil winding work for the pole core T is performed in the same manner as for the pole core S with the exception that the nozzle 42 moves round the pole core T counterclockwise. In other words, in FIG. 17, the nozzle 42 moves from the initial position C to position H, to position G and so on. The field coil for the pole core Y is wound successive to the field coil for the pole core T after shifting the position of the pole core Y further 90° about the axis of the spindle 44 counterclockwise in FIG. 16. In this case, the direction of the movement of the nozzle 42 around the pole core Y is the same as for the coil winding for the pole core S, that is, clockwise in FIG. 17. Then, the field coil for the pole core Z is wound and thus the coil winding work for all the field coils for the pole cores S, T, Y and Z are completed. The cutters 50 and 51 then pull in the magnet wires 22a between the pole core Z and the nozzle 42 and cut the magnet wires 22a. Thus, the field coils for the pole cores S, T, Y and Z are formed successively and the magnet wires 22a are not cut between the field coils but are continuous through the whole field coils from the starting end 29 to the terminating end 30 as shown in FIGS. 10 and 11.

The coil winding machine preferably employed in performing the step of making a rotary electric machine according to the invention is constructed in such that the tip of the nozzle 42 is projected outwardly with respect to the outer surface of the brim portion 23a of the pole core 23 and toward the inner surface of the yoke 21 as shown in FIG. 16. The degree of projection of the nozzle 42 toward the inner surface of the yoke 21 is determined so that the outermost magnet wire of a plurality of randomly bundled magnet wires 22a pulled out through the tip of the nozzle 42 is wound around the pole core 23 in contact with the inner surface of the yoke 21. Furthermore, the gap between the outer surface of the nozzle holder 43 and the inner surface of the pole core 23 is made so small that the plurality of magnet wires 22a do not get over the brim of the pole core 23 to move inwardly to a wrong winding position, when the nozzle 42 rotates about the axis of the nozzle holder 44 by a predetermined angle while moving upwardly and downwardly. On the other hand, the length of the nozzle holder 43 is made larger than that of the pole core 23 and both upper and lower ends of the nozzle holder 43 do not get out of the inner surface of the pole core 23 throughout the upward-downward movement of the nozzle thereby to prevent the plural movement of the nozzle thereby to prevent the plurality of magnet wires 22a from getting over the brim of the pole core 23. Accordingly, even where a plurality of randomly bundled magnet wires are used to form a field coil, none of the plurality of magnet wires gets over the brim of the pole core and the plurality of magnet wires are wound around the pole core smoothly and correctly.

It will be understood from the foregoing description that, according to one aspect of the present invention, there is provided a rotary electric machine especially suitable for use as a starter for an automotive vehicle engine comprising a generally cylindrical yoke 21 having an electrically insulating coating at least on the inner surface thereof, a plurality of pole cores 23 each having an electrically insulating coating on the surface opposite to the inner surface of said yoke, a plurality of field coils 22 formed by continuously and directly winding a wire assembly consisting of a plurality of randomly bundled electrically insulated magnet wires 22a around the central projecting portion of said pole cores within the space defined between the inner surface of said yoke 21 and the field coil mounting surface of said pole cores 23, and an electrical insulator 31 applied to fill the gap between said magnet wires 22a forming said field coils 22, between said field coils 22 and said yoke 21, and between said pole cores 23 and said field coils 22. The present invention having the features set forth in the above is advantageous in that the field coils 22 need not be separately made unlike the prior art process and it eliminates the step of tacking, the step of taping, the step of so-called R-bending for bending the field coils into an arcuate shape so that they meet the contour of the inner surface of the yoke, the step of connection for connecting the field coils 22 by welding or soldering, and the step of assembling. Further, due to the fact that the magnet wires 22a forming the field coils 22 are securely held in place by the electrical insulator 31 between the yoke 21 and the pole cores 23, the complete yoke is highly resistant to vibrations. The complete yoke can be made by a fully automated process, and the starter is light in weight and small in size.

According to another aspect of the present invention, there is provided a rotary electric machine especially suitable for use as a starter for an automotive vehicle engine comprising a generally cylindrical yoke 21 having an electrically insulating coating at least on the inner surface thereof, a plurality of pole cores 23 each having an electrically insulating coating on the surface opposite to the inner surface of said yoke 21, a plurality of field coils 22 formed by continuously and directly winding a wire assembly consisting of a plurality of randomly bundled electrically insulated magnet wires 22a around the central projecting portion of said pole cores 23 within the space defined between the inner surface of said yoke 21 and the field coil mounting surface of said pole cores 23, a brake coil 33 formed by winding a single magnet wire 22a, and an electrical insulator applied to fill the gap between said magnet wires 22a forming said field coils 22 and said brake coil 33, between said yoke 21 and said field and brake coils 22 and 33, and between said pole cores 23 and said field and brake coils 22 and 33. The present invention having the features set forth in the above is far more advantageous than when the field coils 22 and the brake coil 33 are separately made and then assembled in that the starter can be more easily assembled, has an improved reliability against vibrations and is smaller in size and lighter in weight, and the winding operation for forming the field coils can be automated.

According to a further aspect of the present invention, there is provided a rotary electric apparatus of the above character in which a portion 34 of the wire assembly consisting of the magnet wires 22a is taken out between one of the field coils 22 supported on one of the pole cores 23 and the next field coil 22 supported on another pole core 23 so that this portion 34 can be engaged by a bolt or connected to a terminal. The provision of the portion 34 is advantageous in that it eliminates the use of a lead wire.

What is claimed is:

1. A method of making a rotary electric machine suitable for use as a starter for automotive vehicle engines which comprises a generally cylindrical yoke, a plurality of pole cores each fixed to said cylindrical yoke through a central projecting portion and a plurality of field coils each wound in a space defined by the cylindrical yoke, the pole core and the central projecting portion, said method comprising the steps of:

forming an electrically insulating coating on the inner surface of said generally cylindrical yoke;

forming an electrically insulating coating on the surfaces of said pole cores opposite to said inner surface of said cylindrical yoke;

forming a conductor of a plurality of randomly bundled, electrically insulated wires, said wires forming a plurality of parallel conductive paths through said conductor and rendering the cross-sectional shape of said conductor readily deformable;

winding said conductor formed of said plurality of randomly bundled, electrically insulated wires directly on one of said central projecting portions and within said space, and thereafter continuously winding said conductor directly on another central projecting portion in sequence in order to form said field coils, each of said field coils having plural numbers of winding turns; and applying an electrical insulator to fill gaps between said field coils and said cylindrical yoke and said pole cores.

2. A method according to claim 1, which comprises a further step of forming a brake coil by winding a single magnet wire around said central projecting portion of said pole cores.

3. A method according to claim 1, which comprises a further step of taking out a portion of said conductor between one of said field coils supported on one of said pole cores and another of said field coils supported on another of said pole cores so that said portion serves as a means for connection to an output terminal.

4. A method according to claim 1, which comprises a further step of forming a connector by coating a low-melting metal on the inner surface of a sleeve, and securing said sleeve to an end of said field coils by fusing to melt the low-melting metal.

5. A method of making a rotary electric machine suitable for use as a starter for automotive vehicle engines which comprises a generally cylindrical yoke, a plurality of pole cores each fixed to said cylindrical yoke through a central projecting portion and a plurality of field coils each wound in a space defined by the cylindrical yoke, the pole core and the central projecting portion, said method comprising the steps of:

forming an electrically insulating coating on the inner surface of said generally cylindrical yoke;

forming an electrically insulating coating on the surfaces of said pole cores opposite to said inner surface of said cylindrical yoke;

forming a wire assembly of a plurality of randomly bundled, electrically insulated wires, said wires forming a plurality of parallel conductive paths through said wire assembly and rendering the cross-sectional shape of said wire assembly readily deformable;

winding said wire assembly formed of said plurality of randomly bundled, electrically insulated wires directly on one of said central projecting portions and within said space, and thereafter continuously winding said wire assembly directly on another central projecting portion in sequence in order to form said field coils, each of said field coils having plural numbers of winding turns; and applying an electrical insulator to fill gaps between said field coils and said cylindrical yoke and said pole cores.

6. A method of making a rotary electric machine suitable for use as a starter for automotive vehicle engines which comprises a generally cylindrical yoke, a plurality of pole cores each fixed to said cylindrical yoke through a central projecting portion and a plurality of field coils each wound in a space defined by the cylindrical yoke, the pole core and the central projecting portion, said method comprising the steps of:

forming an electrically insulating coating on the inner surface of said generally cylindrical yoke;

forming an electrically insulating coating on the surfaces of said pole cores opposite to said inner surface of said cylindrical yoke;

simultaneously winding a plurality of randomly bundled, electrically insulated wires directly on one of said central projecting portions and within said space, and thereafter continuously winding simultaneously said plurality of randomly bundled electrically insulated wires directly on another central projecting portion in sequence in order to form said field coils, each of said field coils having a plural number of winding turns; and applying an electrical insulator to fill gaps between said field coils and said cylindrical yoke and said pole cores.

* * * * *